Jan. 4, 1938.  F. MARASSO  2,104,432
DOUGH DIVIDER
Filed Nov. 4, 1936  2 Sheets-Sheet 1

Inventor:
Fred Marasso.
by Charles C. Harvey,
his Atty.

Jan. 4, 1938.  F. MARASSO  2,104,432
DOUGH DIVIDER
Filed Nov. 4, 1936  2 Sheets-Sheet 2
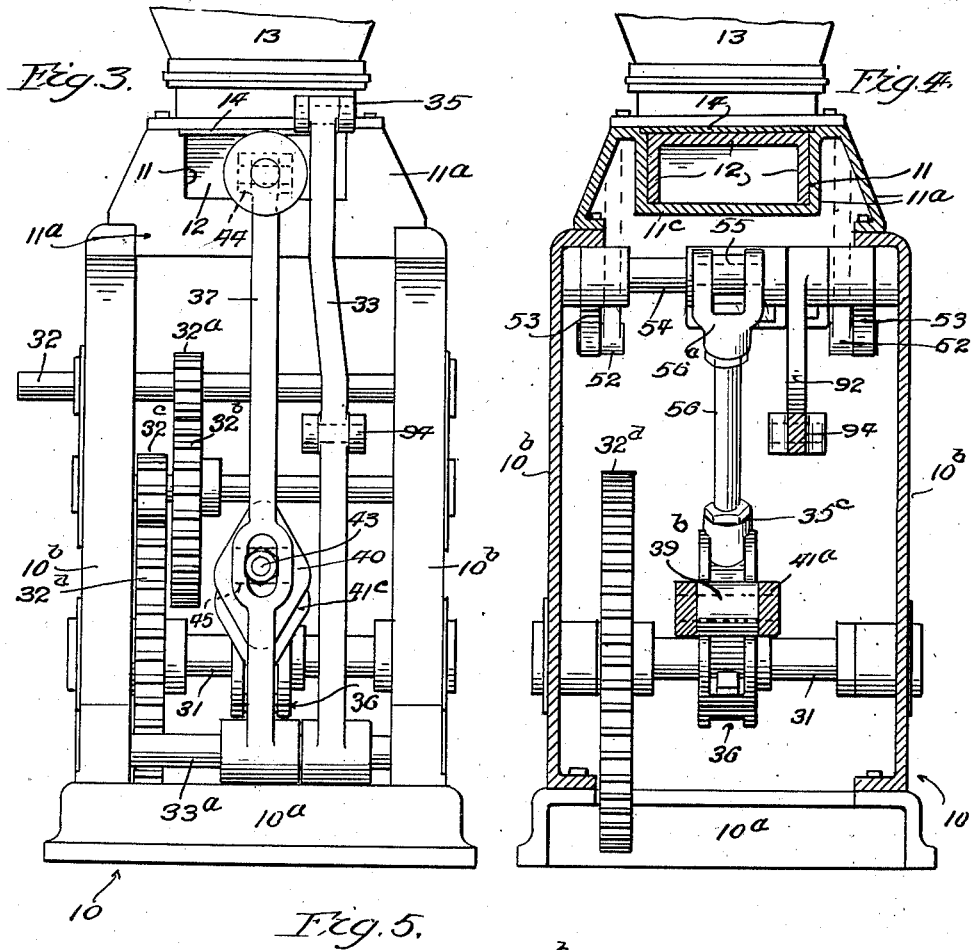
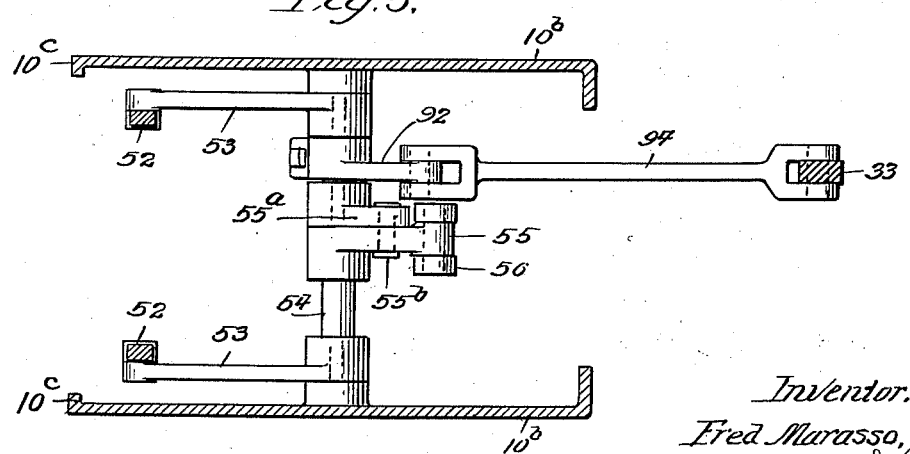
Inventor:
Fred Marasso,
By Charles O. Hervey
his Atty.

Patented Jan. 4, 1938

2,104,432

UNITED STATES PATENT OFFICE 2,104,432

DOUGH DIVIDER

Fred Marasso, Joliet, Ill., assignor to Union Machinery Company, Joliet, Ill., a corporation of Illinois Application November 4, 1936, Serial No. 109,102

6 Claims. (Cl. 107—15)

This invention relates to dough dividers, and more particularly to dough dividers of that type which employ a reciprocating measuring head in connection with a knife and with a plunger or ram operating in a charging chamber to force the dough therefrom into measuring pockets contained in the measuring head.

One of the objects of the present invention is to simplify, to reduce the number of operating elements, and to otherwise improve upon the actuating mechanism for these elements.

In dough dividers of this type, heretofore it has been customary to provide separate eccentrics or cams for actuating the measuring head, the knife and the plunger, and sometimes two eccentrics have been employed for operating these three elements, and one of the objects of this invention is to employ a single eccentric or rotary motion transmitting element, such as a crank, for actuating at least two of said elements, and provide operative connections between the same and at least two of said elements, or between the eccentric and the measuring head, the knife and the plunger, whereby said elements are actuated in timed relation to each other.

With the use of a single eccentric, a smoother and more silent actuating mechanism is provided, and the divider may be run at a much higher speed than those now on the market, which at the present time is of great importance.

With these and other objects and advantages in view, this invention consists in the several novel features hereinafter fully set forth and claimed.

The invention is clearly illustrated in the drawings accompanying this specification, in which:—

Fig. 3 is a rear elevation of the divider, with certain parts omitted, and looking in the direction of the arrow 3 in Fig. 1;

Fig. 4 is a vertical cross-section, taken on the broken line 4—4 of Fig. 1; and

Fig. 5 is a view, partly in plan and partly in horizontal section, illustrating certain members of the actuating mechanism, the line of section being indicated at line 5—5 of Fig. 1.

Figure 1:
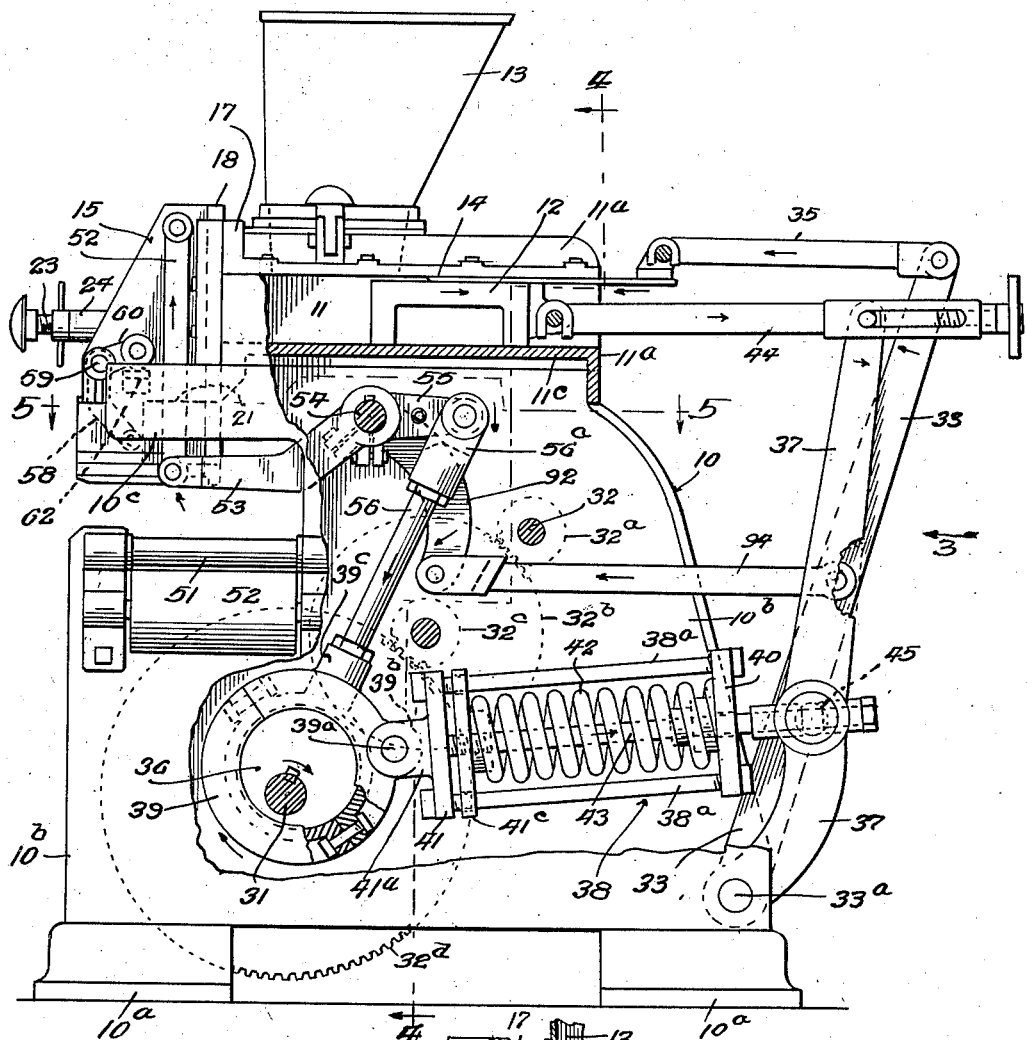
Fig. 1 is a side elevation of a dough divider embodying a simple form of the present invention and showing one of the side frames partly broken away and certain parts in section, to illustrate the actuating mechanism more clearly.
Figure 2:
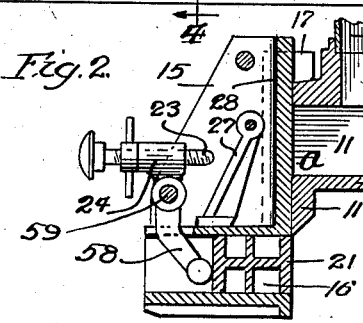
Fig. 2 is a vertical longitudinal section, taken through the measuring head and a fragment of the charging chamber.

In the embodiment of the invention shown, it has been illustrated in connection with the dough divider shown and described in Patent Number 2,007,686, issued July 9, 1935, to Union Machinery Company, to which reference may be had for a more detailed description of the operating mechanism of that machine. Where possible, the same reference characters have been applied to the elements in the machine illustrated as are applied to the corresponding elements of the machine of the above mentioned patent.

Referring now to the drawings accompanying this specification, which are merely illustrative of the preferred embodiment of the invention and are not intended as working drawings, the reference character 10 designates the supporting frame of the divider, here shown as comprising two base members 10ª, from which rise two spaced side frame members 10ᵇ, which are bolted thereto. Connecting the upper ends of the side frame members is a casing 11ª which contains a rectangular charging chamber 11, in which is reciprocated a charging plunger or ram 12. Supported on the casing 11ª, is a hopper 13 which opens at its lower end into the charging chamber adjacent the forward or discharge end, a, thereof. The opening from the hopper to the charging chamber is controlled by a reciprocating knife 14, slidably mounted in the casing 11ª directly above the charging plunger. At the discharge end of the charging chamber is a reciprocatory measuring head 15, having measuring pockets therein, arranged side by side, one of which is seen at 16, into which the charging plunger forces the dough from the charging chamber when the measuring head occupies its upper position, in which the measuring pockets register with the discharge opening in the charging chamber. A vertical reciprocating measuring head is illustrated, but it is to be understood that any of the well known and common measuring heads now in use in dividers may be substituted therefor.

Oppositely disposed upright guides 17 for the measuring head are provided on the casing 11ª and said guides are formed with vertical grooves or guideways in which are guided ribs or flanges 18 that are formed on the two sides of the measuring head. The measuring head is divided into several measuring pockets 16, and in each of said pockets is a reciprocable ejecting plunger 21.

Adjustable stop mechanism is provided for determining the rear limit of movement of the ejecting plungers which takes place when the dough is forced into the measuring pockets. The adjustment means shown comprise an adjustment screw 23 threadedly mounted in a swinging bracket 24 and arranged to strike against a stop member 27 mounted on the measuring head. The ejecting plungers 21 are moved through their ejecting strokes by swinging arms 58 (one for each plunger), which are mounted on a shaft 59 journaled in the measuring head. Actuating arms 60, mounted on the ends of said shaft 59, are arranged to encounter brackets 62 carried by forward extensions 10c of the side frame members and thereby move forward the ejecting plungers as the measuring head approaches the limit of its down stroke. The adjustment screw bracket 24 is rigidly mounted on the shaft 59, and when the ejecting plungers are again forced back by the dough entering the measuring pockets the arms 58 are swung back by the plungers and the bracket 24 and adjusting screw swing forward until the screw encounters the stop member 27 and thereby limits the back stroke of the plungers.

At its rear side the head 15 is formed with a vertical wall 28 which has openings therein at its lower end that comprise the openings to the measuring pockets. A vertical wall 11b, contiguous with the face of the wall 28, projects down from the bottom wall 11c of the charging chamber. At the lower edge of the wall 11b it is formed with a knife edge which serves to strip the lumps of dough from the faces of the ejecting plungers when the lumps of dough have been discharged from the measuring pockets and while the measuring head is being moved upward from the position shown in the drawings.

Journaled in suitable bearings carried by the side frame members is a drive shaft 31, which is driven from a shaft 32, by a set of speed reducing gears 32a, 32b, 32c and 32d. The shaft 32 may be belted to or driven from an electric motor or other source of power (not shown).

On the drive shaft 31 is a single eccentric 36, or other rotatory motion transmitting element such as a crank, which, through connections with the measuring head, the knife and the charging plunger, actuates the said elements in timed relation to each other to perform the functions of cutting off a charge of dough in the charging chamber from that in the hopper, charging the measuring pockets and reciprocating the measuring head. The eccentric or crank may, however, be used for actuating only two of said elements, and a second rotatory member may be used for actuating the third element.

Swingably mounted upon a rod 33a secured in the side frame members at the lower rear corners thereof, is a knife actuating lever 33, the upper end of which is connected to the knife 14 by a link 35. A plunger actuating lever 37 is also swingably mounted on the rod 33a and its upper end is connected to the charging plunger 12 by a link 44.

Rotatively mounted in the side frame members is a rock shaft 54, upon which two head actuating arms 53 are keyed or otherwise rigidly fastened and the ends of said arms are connected to the measuring head by links 52. It is to be observed that by oscillating the levers 33, 37 and arms 53, through predetermined strokes at timed relation to each other, the knife, the charging plunger and the measuring head will be reciprocated in timed relation to perform their several functions.

In the form of the invention illustrated, the levers 33, 37 and arms 53 are connected to the single eccentric 36 by actuating mechanism which will now be described.

To the eccentric strap 39 of the eccentric 36 is swiveled or pivotally connected one end of a spring shackle 38, or other cushioned link connection, the other end thereof being connected to the plunger actuating lever 37. The spring shackle illustrated provides a cushioned connection between the eccentric and plunger actuating lever and, as shown, comprises a spring saddle 41 formed with ears 41a which are pivotally connected by a pin 39a to an ear 39b formed on the eccentric strap. The spring saddle 41 is rigidly connected to a second spring saddle 40 by rods 38a and slidably mounted on said rods 38a is a movable spring saddle 41c threadedly mounted on one end of a connecting rod 43 which is secured to a pin 45 rotatively held in the lever 37. A coiled compression spring 42 is interposed between the spring saddles 40, 41c and normally holds the free end of the connecting rod 43 against the spring saddle 41, thereby limiting the expansive movement of the spring. The pull of the eccentric on the lever 37 is through the spring shackle, the direct pull being on the spring saddle 41, rods 38a and spring saddle 40. The latter bears against the spring, which bears against the spring saddle 41c and the latter pulls upon the rod 43 which pulls upon the lever 37.

Secured upon the rock shaft 54 is a crank arm 55, the end of which is connected to the eccentric by an eccentric rod 56. The eccentric rod has a forked member 56a on its upper end which is connected to the crank arm 54 by a pin and the lower end of the eccentric rod 56 is secured in a boss 39c formed upon the eccentric strap 39. The crank arm 55 is desirably formed of two members connected together by a shear pin 55b, the member 55a being keyed or otherwise fastened upon the rock shaft 54 and the main member 55 being loose upon the rock shaft. The purpose of this arrangement is to prevent breakage to any of the parts of the machine in case a jam occurs, the shear pin being weak enough to be shorn off in case of an emergency.

The angular relation of the eccentric rod 56 to the pin 39b (which connects the spring shackle to the eccentric) is an important factor in determining the timing between the plunger actuating lever 37 and head actuating arms 53. The angular position shown in the drawings illustrates the proper angle required to enable the parts to perform their functions in timed relation in the divider shown. The eccentric has two actuating elements directly connected to it, which, I believe, is novel in a dough divider.

The knife actuating lever 33 is operatively connected to the rock shaft 54 by connecting mechanism, here shown as comprising a crank arm 92, rigidly mounted on the rock shaft 54 and a link 94 connecting said crank arm with the knife actuating lever 33.

A conveyor belt (not shown) is provided below the measuring head 15 to receive the measured lumps of dough discharged therefrom and said belt is trained around rollers, one of which is shown at 51, which is driven by suitable driving mechanism operated from one of the shafts of the machine. Said conveyor belt discharges the lumps upon a second conveyor belt (not shown), one end of which is trained around a roller 52 and is provided for conveying the lumps of dough away from the machine. These parts are more fully shown and described in the patent above referred to.

For the purpose of illustrating the present invention, I have shown all of the elements connected with or related to the novel feature, which consists in the provision of a single eccentric or rotatory actuating element and operative connection between said element and measuring head, a knife and a plunger, or between said eccentric and at least two of said elements.

In the operation of the divider a batch of dough is delivered into the hopper 13 and a portion thereof is taken into the charging chamber 11 upon the back stroke of the charging plunger 12 and cut off from the remainder by the knife, and when the measuring head occupies its upper position, the dough is charged into the measuring pockets from the charging chamber by the charging plunger, after which the measuring head is lowered and the measured lumps of dough are discharged from the pockets thereof and fall upon the conveyor belt under the measuring head. The mode of operation of the divider, with the exception of the novel feature disclosed herein, is substantially the same as that of the divider shown and described in the above mentioned patent.

In the accompanying drawings the parts are illustrated in the position assumed when the measuring head has reached its lower limit of movement. At this time the knife has reached its rearward limit of movement and the charging plunger is on its back stroke and is occupying a position slightly in advance of its rear limit of movement. The arrows on the various elements show the directions of movement of said parts at the time the eccentric passes the dead centre and is ready to begin its down stroke. The drive shaft 31 and eccentric 36 rotate in the direction of the adjacent arrows and during movement through approximately ninety degrees of rotation, the charging plunger is moved backward to the limit of its rear stroke.

During the movement of the eccentric through an arc of approximately 180 degrees from that shown, the measuring head is moved to its uppermost position, the knife is moved forward in advance of the charging plunger, thereby cutting off the dough contained in the charging chamber from that contained in the hopper, and the charging plunger is approaching the end of its charging stroke, the limit of its charging stroke being reached when the eccentric has moved approximately 220 degrees from the position shown in the drawings. At this time the measuring head has commenced its down stroke and when the eccentric has made a complete revolution back to the position shown, the several parts have again been brought to the position seen in the drawings, and at this time the plunger ejecting mechanism operates to eject the measured lumps of dough from the measuring pockets.

From the above it is apparent that with a single eccentric, the number of operating parts of the machine have been reduced and that a smooth, noiseless and high speed mechanism is obtained. It will also be observed that one of the connections between the eccentric and the motion converting elements connected thereto is rigid with the eccentric strap and the other is swiveled or pivotally connected thereto. As shown, the eccentric rod 56 is rigid with the eccentric strap and the spring shackle is swiveled or pivotally connected thereto, thereby permitting the eccentric movement of the eccentric.

More or less variation of the exact details of construction is possible without departing from the spirit of this invention. I desire, therefore, not to limit myself to the exact form of the construction shown and described, but intend, in the following claims to point out all of the invention disclosed herein.

I claim as new and desire to secure by Letters Patent:

1. In a dough divider, the combination of a frame, a drive shaft journaled therein, a single eccentric having an eccentric block mounted on said drive shaft, and an eccentric strap, a dough charging chamber in said frame, a plurality of reciprocating elements co-operating with said dough charging chamber to measure lumps of dough, and operative connections between said eccentric strap and said reciprocating elements for converting the eccentric movement of the eccentric into the reciprocating movements of said reciprocating elements, one element of said connections being rigid with said strap and one element of said connections being swiveled thereto.

2. In a dough divider, the combination of a frame, a drive shaft journaled therein, a single eccentric block mounted on said drive shaft, a single eccentric strap on the eccentric block, a dough charging chamber in said frame, a reciprocatory dough measuring head, a reciprocatory plunger and a reciprocatory knife, all associated with said charging chamber, head operating connections between said single eccentric strap and the dough measuring head, operative connections between the head operating connections and the knife, and operative connections between the strap and the plunger, whereby said elements are reciprocated in timed relation to each other.

3. In a dough divider, the combination of a frame, a drive shaft journaled therein, a single eccentric block and strap mounted on said drive shaft, a dough charging chamber in said frame, a reciprocatory dough measuring head, a reciprocatory plunger and a reciprocatory knife, all associated with said charging chamber, motion transmitting connections between the eccentric strap and the measuring head and the knife, and other motion transmitting connections between said eccentric strap and the charging plunger.

4. In a dough divider, the combination of a frame, a drive shaft journaled therein, a single eccentric mounted on said drive shaft, a dough charging chamber in said frame, a reciprocatory dough measuring head, a reciprocatory plunger and a reciprocatory knife, all associated with said charging chamber, a rock shaft rotatively mounted in said frame, operative connections between said rock shaft and measuring head, and operative connections between said rock shaft and knife, a crank arm on said rock shaft, an eccentric rod connecting said eccentric with said crank arm, and cushioned connections between the eccentric and charging plunger.

5. In a dough divider, the combination of a frame, a drive shaft journaled therein, a single eccentric mounted on said drive shaft, a dough charging chamber in said frame, a reciprocatory dough measuring head, a reciprocatory plunger and a reciprocatory knife all associated with said charging chamber, and operative motion transmitting connections between the eccentric, the measuring head and the knife for converting the eccentric movement of the eccentric into the reciprocating movements of the measuring head and knife, said connections having a rigid connection with the strap of the eccentric, and a cushioned motion transmitting connection between the eccentric and charging plunger for converting the eccentric movement of the eccentric into the reciprocatory movements of the plunger, said last named connection having a swiveled connection with the eccentric.

6. In a dough divider, the combination of a drive shaft, a single eccentric mounted thereon, an eccentric strap on said eccentric, a motion transmitting rod rigid with and extending from said strap, a dough measuring head and operative connections between the head and rod, a cushioned motion transmitting member angularly disposed with respect to said rod and having a swiveled connection with said eccentric strap, a plunger and a lever, connected to the cushioned motion transmitting member.

FRED MARASSO.